US007434105B1

(12) United States Patent
Rodriguez-Rivera et al.

(10) Patent No.: US 7,434,105 B1
(45) Date of Patent: Oct. 7, 2008

(54) SELECTIVE SELF-HEALING OF MEMORY ERRORS USING ALLOCATION LOCATION INFORMATION

(75) Inventors: Gustavo Rodriguez-Rivera, West Lafayette, IN (US); Michael P. Spertus, Chicago, IL (US)

(73) Assignee: Symantec Operating Corporation, Cupertino, CA (US)

( * ) Notice: Subject to any disclaimer, the term of this patent is extended or adjusted under 35 U.S.C. 154(b) by 509 days.

(21) Appl. No.: 11/268,360

(22) Filed: Nov. 7, 2005

(51) Int. Cl.
*G06F 11/00* (2006.01)
(52) U.S. Cl. ............................ 714/38; 714/42
(58) Field of Classification Search ............. 714/38
See application file for complete search history.

(56) References Cited

U.S. PATENT DOCUMENTS

| 5,355,483 | A  | * | 10/1994 | Serlet ..................... 711/154 |
| 5,687,368 | A  | * | 11/1997 | Nilsen .................... 707/103 R |
| 5,909,580 | A  | * | 6/1999  | Crelier et al. ............ 717/141 |
| 6,035,426 | A  | * | 3/2000  | Applegate ................ 714/54 |
| 6,349,312 | B1 | * | 2/2002  | Fresko et al. ............ 707/205 |
| 6,496,850 | B1 | * | 12/2002 | Bowman-Amuah ......... 709/203 |
| 6,546,477 | B1 | * | 4/2003  | Russo et al. .............. 711/170 |
| 6,874,074 | B1 | * | 3/2005  | Burton et al. ............. 711/170 |
| 7,024,535 | B2 | * | 4/2006  | Fougeroux et al. ........ 711/170 |
| 7,051,056 | B2 | * | 5/2006  | Rodriguez-Rivera et al. ..... 707/206 |
| 7,096,339 | B2 | * | 8/2006  | Nelson .................... 711/170 |
| 7,174,354 | B2 | * | 2/2007  | Andreasson .............. 707/206 |
| 7,181,585 | B2 | * | 2/2007  | Abrashkevich et al. ..... 711/170 |
| 7,234,080 | B2 | * | 6/2007  | Cirne et al. .............. 714/38 |
| 7,293,201 | B2 | * | 11/2007 | Ansari .................... 714/38 |
| 7,296,130 | B2 | * | 11/2007 | Dimpsey et al. .......... 711/170 |
| 7,299,384 | B1 | * | 11/2007 | Rodriguez-Rivera et al. .. 714/52 |
| 2002/0035676 | A1 | * | 3/2002 | Weeks ..................... 711/170 |
| 2004/0015642 | A1 | * | 1/2004 | Moir et al. ............... 711/1 |
| 2004/0078540 | A1 | * | 4/2004 | Cirne et al. .............. 711/170 |
| 2004/0117771 | A1 | * | 6/2004 | Venkatapathy ........... 717/130 |
| 2004/0158589 | A1 | * | 8/2004 | Liang et al. .............. 707/206 |
| 2004/0172513 | A1 | * | 9/2004 | Nelson .................... 711/170 |

(Continued)

OTHER PUBLICATIONS

Van Der Wal, Ron; "Testing testers: Error detection tools for Win32"; Review; Jul. 1996; Internet; Tarma Software research; http://www.tarma.com/index.htm#/articles/1996jul.htm.

(Continued)

*Primary Examiner*—Michael C Maskulinski
*Assistant Examiner*—Neil D Miles
(74) *Attorney, Agent, or Firm*—Meyertons Hood Kivlin Kowert & Goetzel, P.C.; B. Noël Kivlin (57) ABSTRACT

A system for selective self-healing of memory errors comprises a processor coupled to a memory, where the memory stores instructions executable by the processor to store an error record for each memory management error detected during an execution of the application. The error record identifies an allocation location (e.g., a portion of a stack trace corresponding to the invocation of a memory allocation function such as malloc( )) of an object associated with the memory management error. The instructions are executable to use the error record to identify, during subsequent execution, memory operations performed on objects allocated from the allocation location, and to perform corresponding memory protection operations (e.g., operations to prevent re-occurrences of the memory errors) for the memory operations identified using the error record.

25 Claims, 6 Drawing Sheets

U.S. PATENT DOCUMENTS

| | | | |
|---|---|---|---|
| 2004/0225925 A1* | 11/2004 | Chen | 714/42 |
| 2005/0022063 A1* | 1/2005 | Grebenev | 714/38 |
| 2005/0235124 A1* | 10/2005 | Pomaranski et al. | 711/170 |
| 2005/0235127 A1* | 10/2005 | Muthiah et al. | 711/170 |
| 2006/0294433 A1* | 12/2006 | Thelen | 714/38 |
| 2007/0011415 A1* | 1/2007 | Kaakani et al. | 711/159 |

OTHER PUBLICATIONS

"Develop Fast, Reliable Code with IBM Rational PurifyPlus"; Paper; 2003; Internet; Rational Software Corporation; ftp://ftp.software.ibm.com/software/rational/web/whitepapers/2003/PurifyPlusPDF.pdf.

"VERITAS (tm) Application Saver 1.2—User's Guide—Windows"; Manual; 2004; Internet; VERITAS Software Corporation; http://ftp.support.veritas.com/pub/support/products/Application_Saver/266719.pdf.

Best, Steve; "Linux Debugging and Performance Tuning: Tips and Techniques"; Article; Oct. 10, 2005; Pearson PTR.

"Managing Application Reliability with VERITAS (tm) Application Saver"; White Paper; 2004; Internet; VERITAS Software Corporation; http://eval.symantec.com/mktginfo/enterprise/white_papers/veritas_application_saver_2_1_wp.pdf.

Grunwald, Dirk and Benjamin Zorn; "CustoMalloc: Efficient Synthesized Memory Allocators"; Technical Report; Jul. 1992; University of Colorado at Boulder.

* cited by examiner

| Error Type | Examples Of Memory Protection Operation(s) And Reporting Actions |
|---|---|
| Premature Free | Report Error; Remove Object From Free List And Do Not Use Object For Allocation; Designate Objects Allocated From Corresponding Allocation Location As *"Unsafe To Free"* (To Be Garbage Collected And Not Explicitly Freed); Save Corresponding Allocation Location In File For Future Runs Of Program |
| Duplicate Free | Report Error; Remove Object From Free List And Do Not Free Object; Designate Objects Allocated From Corresponding Allocation Location As *"Unsafe To Free"* (To Be Garbage Collected And Not Explicitly Freed); Save Corresponding Allocation Location In File For Future Runs Of Program |
| Premature Garbage Collection | Report Error; Designate Objects Allocated From Corresponding Allocation Location As *"Unsafe To Collect"* (To Be Explictly Freed And Not Garbage Collected); Save Corresponding Allocation Location In File For Future Runs Of Program |
| Memory Leak | Update Memory Leak Statistics; Designate Objects Allocated From Corresponding Allocation Location As "Obtain Complete Stack Trace" (Report Complete Stack Trace When An Object Is Allocated From Allocation Location) |
| Memory Smash | Report Error; Designate Objects Allocated From Corresponding Allocation Location As "Add N Bytes On Allocation" (To Pad Extra Bytes On Allocations); Add Guard Words With Known Values To Object; Save Corresponding Allocation Location In File For Future Runs Of Program |

SELECTIVE SELF-HEALING OF MEMORY ERRORS USING ALLOCATION LOCATION INFORMATION

BACKGROUND OF THE INVENTION

1. Field of the Invention

This invention relates to computer systems and, more particularly, to handling memory management errors within computer systems.

2. Description of the Related Art

Memory management has long been known as a source of errors or "bugs" in computer applications. Often applications, e.g., those applications written at least partly using programming languages such as C and C++ that allow programmers to manage memory, are introduced into production environments even though they may contain memory management bugs. Even programs that may be considered relatively bug-free, e.g., as a result of thorough testing prior to release, may rely on third-party libraries that may contain memory management bugs. As a result, the executable code of a production application may often result in various types of memory management errors such as memory leaks, premature frees, duplicate frees, memory smashes etc.

Various techniques have been developed to identify such memory management errors, e.g., by instrumenting the application code to track object creations and deletions. Several such techniques support the elimination of certain types of memory management errors by implementing global error correction or prevention. For example, in one such global technique, all explicit programmer-initiated memory de-allocation functions (e.g., "free( )") may be eliminated from the application via code substitution or code modification, and a conservative garbage collection mechanism may instead be used to release memory. In another such global scheme, memory smashes (where a program modifies memory beyond the end of an allocated object, thus potentially modifying neighboring objects or data structures) may be largely or completely avoided by extending the size of each allocated object by additional bytes.

However, many of these global techniques may be accompanied by negative side effects. For example, a global replacement of programmer-initiated memory de-allocation by conservative garbage collection may result in a substantial increase in both execution time (e.g., because of the extra processing required for the garbage collection) and memory used (e.g., because the aggregate amount of memory used by the application may grow relatively large between successive garbage collection events). Adding extra bytes to each allocated object to avoid memory smashes may also lead to excessive use of memory. The frequency of occurrence of memory management bugs within a program relative to the frequency of occurrence of "correct" (i.e., error-free) memory operations may often be relatively low, so that the overhead of global memory error handling schemes may not always be justifiable in some cases. In fact, in practice, the overhead of the global techniques has sometimes been found to be so high that administrators have deliberately disabled global memory error handling mechanisms; that is, administrators have sometimes been willing to accept the risks of memory management errors in preference to the overhead of global memory error handling. A more flexible approach towards memory error handling may provide application administrators and application users with a better tradeoff between the risk of memory management errors and the overhead of error prevention or correction.

SUMMARY

Various embodiments of systems and methods for selective self-healing of memory errors using allocation location information are disclosed. According to one embodiment, a system comprises a processor coupled to a memory, where the memory stores instructions executable by the processor to store an error record for each memory management error detected during an execution of the application. The instructions may, for example, implement a memory management tool configured to detect errors and selectively perform memory protection operations in response to the detection of the errors. The error record may identify an allocation location (e.g., a portion of a stack trace corresponding to the invocation of a memory allocation function such as malloc( )) of an object associated with the memory management error, such as an object that is freed prematurely or an object that is freed multiple times. The allocation location may be within one or more shared libraries used by the application in some embodiments, and may be in the main program of the application itself in other embodiments. The error record may thus indicate that some portions of code may be "unsafe" allocation locations, e.g., indicating that objects allocated from those unsafe locations during subsequent execution of the application may be more likely to be involved in memory management errors than objects allocated from other allocation locations. Using the error records, one or more memory operations performed on objects allocated from unsafe allocation locations may be identified by the memory management tool during subsequent execution, and corresponding memory protection operations (e.g., operations to prevent re-occurrences of the memory errors, or to counteract negative effects of the memory errors) may be performed.

The memory management tool may be configured in one embodiment to examine the database of error records to determine, for a given memory operation during an execution of the application, whether a memory protection operation is needed, and to only perform memory protection operations for those objects that were allocated from unsafe allocation locations, allowing operations on other objects to be performed without corresponding memory protection operations. In this way, the memory management tool may reduce the overhead of memory protection operations in comparison to other global techniques where memory protection operations may be performed for each memory operation. In some embodiments, the memory management tool may generate an allocation location record corresponding to each allocation event in the application, and use the allocation location records to generate the error records (e.g., for any object involved in a given memory management error, the tool may look up the allocation location of the object in an allocation location database, and designate that allocation location as an unsafe allocation location in an error record).

In some embodiments, the error may be detected in the same execution in which a corresponding memory protection operation is performed: e.g., an unsafe allocation location may be identified in a particular function, and a memory protection operation may be performed if and when a memory operation is performed on another object allocated from that same function while the application is still executing. In other embodiments, a persistent version (e.g., a "profile" or "unsafe allocation location list") of error records may be generated for use across multiple executions of the application. In one such embodiment, protective memory operations may be performed proactively using the persistent version, i.e., memory management errors that were detected in an earlier execution may be entirely eliminated during a later execution of the application using memory protection operations.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
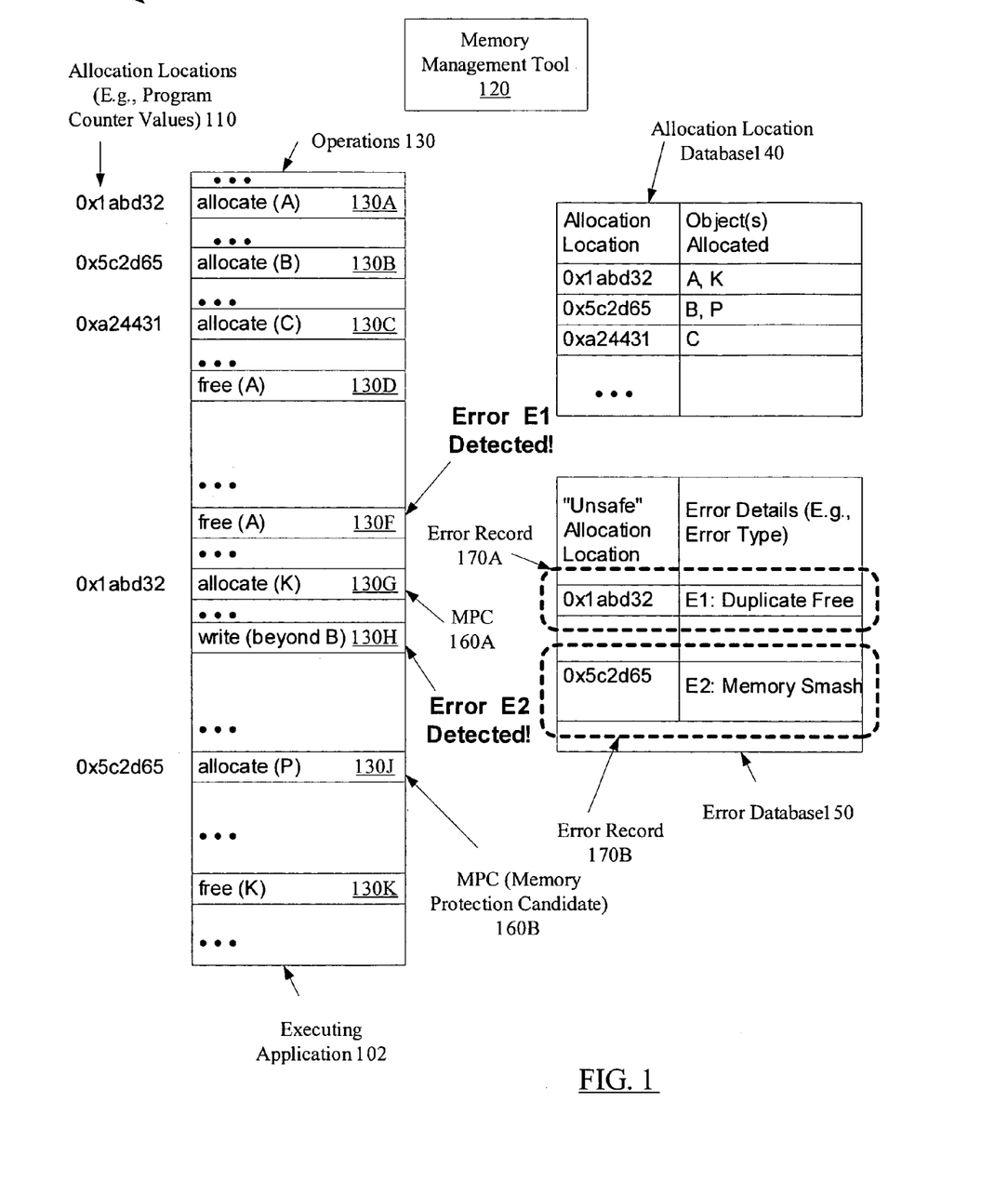
FIG. 1 is a block diagram illustrating one embodiment of a system.

FIG. 1 is a block diagram illustrating a system 100 according to one embodiment. As shown, system 100 includes a memory management tool 120, an allocation location database 140 and an error database 150. The memory management tool 120 may be configured to detect memory management errors in an executing application 102 and to perform or initiate memory protection operations in response to at least some of the detected memory management errors. The allocation location database 140 and the error database 150 may be implemented as a single database in some embodiments, and may share at least some components in other embodiments. In one embodiment memory management tool 120 may be configured to store, corresponding to each object for which memory is allocated in executing application 102, an allocation location (e.g., a portion of an application stack trace, or a program counter value corresponding to a caller of a function such as malloc( ) that is invoked to allocate the object) in the allocation database 140. When a memory management error is detected during the execution of application 102, the memory management tool 120 may be configured to store an error record 170 (e.g., error record 170A or 170B of FIG. 1) in error database 150. The error record 170 may include an allocation location corresponding to the allocation of an object associated with the memory error—e.g., if an error occurs when an object "A" is freed, the allocation location for "A" may be stored in a corresponding error record 170. The allocation locations and the occurrences of memory management errors may be detected by memory management tool 120 using a variety of techniques in different embodiments, such as dynamic substitution of existing memory management functions by customized versions of the functions.

The memory management tool 120 may be configured to use the error records 170 to identify potentially problematic allocation locations. For example, if a memory management error occurs during an operation associated with an object allocated from a particular location within a particular function of a shared library, the memory management tool 120 may determine that it is likely that other objects allocated from that location, that function, and/or that shared library may also eventually be involved in memory management errors. The potentially problematic allocation location may be termed an "unsafe" allocation location herein. The memory management tool 120 may be configured to use the error records 170 to identify other memory management operations that are performed on objects allocated from such unsafe allocation locations, and to perform memory protection operations corresponding to the identified memory management operations. Other objects may be allocated from the unsafe allocation locations, for example, during the same execution in which the errors are detected (e.g., if a function in which the unsafe allocation is performed is called multiple times in the application), or in a different execution of the application. The term "memory protection operation" as used herein, generally refers to an operation that may be performed in response to a memory management error, e.g., to prevent a re-occurrence of the error, to alleviate effects of the error, etc. Various types of memory protection operations may be performed for different types of memory operations, e.g., extra memory may be allocated to prevent data corruption due to memory smashes on objects allocated from the unsafe allocation locations, or the manner in which objects allocated from the unsafe allocation location in the future are freed may be modified. For some kinds of memory management errors, a memory protection operation may include a notification of detailed information about the error (such as a report of a full stack trace corresponding to a memory leak). Further details on how memory management errors of various types may be detected in various embodiments, and the specific types of memory protection operations performed for errors of different types are provided below.

Using error records 170, memory management tool 120 may be operable to determine, for a given memory operation performed on an object during the execution of application 102, whether a memory protection operation is to be performed or not, and may only perform memory protection operations for those objects identified as having been allocated from a potentially problematic allocation location. Other memory operations performed on objects that have not yet been identified as unsafe may be allowed to proceed without any change, e.g., without performing any corresponding memory protection operations. By restricting the use of memory protection operations to operations on objects allocated only from "unsafe" locations, memory management tool 120 may avoid the excessive overhead associated with some traditional global memory error handling mechanisms that may, for example, perform memory protection operations for all objects allocated from all locations. The level of protection provided by the memory management tool 120 may be similar or equivalent to that provided by traditional global memory error handling mechanisms, potentially with much lower resource costs, especially for applications in which the majority of errors are located in a relatively small subset of the code (e.g., in a third-party shared library or in a few subcomponents of the code). It is noted that not all memory operations performed on objects allocated from unsafe allocation locations may actually lead to errors if memory protection operations are not performed; thus, even some of the limited memory protection operations performed by memory management tool 120 may not be strictly necessary. However, the reduction of the number of memory protection operations performed using the selective techniques employed by memory management tool 120, compared to the number that would be performed using some conventional global memory error handling techniques, may be substantial and may result in a much lower impact on application performance and resource consumption.

Several exemplary memory related operations 130 (e.g., operations 130A-130K) of executing application 102 are illustrated in FIG. 1. For example, operation 130A allocates an object "A". FIG. 1 illustrates exemplary allocation locations 110 in the form of hexadecimal program counter values of the calling function for each allocation operation shown— e.g., the allocation location of operation 130A is "0x1abd32" (the "0x" suffix indicates that the remaining portion of the value is to be treated as a hexadecimal number). Memory management tool 120 may enter the allocation location for object "A" into allocation location database 140, as shown. It is noted that in some embodiments, allocation location database 140 and/or error database 150 may be maintained in volatile memory only, while in other embodiments, portions or all of one or both databases may be saved in persistent storage as well. The exact format and/or content of allocation locations stored in the allocation location database 140 may vary in different embodiments. E.g., in some embodiments, instead of simply storing one program counter value corresponding to a function that invoked the allocation function such as malloc( ), additional information such as function names and/or program counter values of two or three levels of the stack frame at the time of the allocation may be included in the allocation location database. If a malloc( ) function to allocate "A" was invoked from a first function F1, which was called from a second function F2, which was called by a third function F3, for example, the names and/or program counter values for each of F1, F2 and F3 may be stored in allocation location database 140 in some implementations, and each of the program counter values and/or functions may thereby be designated as an "unsafe" allocation location in such implementations. The format and order of the records in the allocation location database 140 may differ in different embodiments. For example, in some embodiments, the database 140 may be stored in a sort order based on the allocation location, and in other embodiments one or more indexes may be created corresponding to the columns of the database such as allocation location, object name, object address, etc. The columns included in the allocation location database 140 in some embodiments may differ from those shown in FIG. 1, e.g., in embodiments where more detailed allocation location information is stored than a single program counter value, multiple columns may be used for various elements of the allocation location information.

In some embodiments, memory management tool 120 may be configured to create a new entry in allocation location database 140 for each allocation operation of application 102 for which an entry does not already exist. E.g., on encountering allocation operation 130B for object "B", a new entry may be created, and on encountering allocation operation 130C for object "C", another new entry may be created in the allocation location database 140. In some embodiments, when an allocation occurs from a location for which an entry already exists in allocation database 140 (e.g., when object "K" is allocated from location "0x1abd32" in operation 130G), the memory management tool 120 may simply add an identification of the newly allocated object to the existing entry; in other embodiments, multiple separate entries for the same allocation location may be created if multiple objects are allocated from that location.

Memory management tool 120 may be configured to detect a variety of different types of memory management errors, of which two types are illustrated in FIG. 1. A first type of memory management error, which may be termed a "duplicate free", occurs when an object that has already been freed is freed again. At some point after "A" is allocated in the execution, "A" may be freed, e.g., in operation 130D. If "A" is subsequently freed again, e.g., at operation 130F, the memory management tool 120 may be configured to detect the repeated or duplicated free as a memory management error. In FIG. 1, for example, memory management tool 120 detects an error "E1" when operation 130F is attempted, and stores a corresponding error record 170A in the error database 150. Since the error is associated with object "A" (i.e., memory allocated for "A" is being freed a second time), the error record 170A indicates that the allocation location "0x1abd32" at which "A" was allocated is an "unsafe" allocation location. Another type of memory management error, termed a "memory smash", may be detected if application 102 attempts to modify memory beyond the end of an object, as shown in operation 130H where a write beyond the allocated memory of object "B" is attempted and memory management tool 120 detects the error E2. Memory management tool 120 may generate another error record 170B in error database 150 corresponding to error E2, indicating that the allocation location "0x5c2d65" of object "B" is another potentially problematic or "unsafe" allocation location. In addition to storing the unsafe allocation locations in the error records 170, memory management tool 120 may be configured to store additional information in each error record in some embodiments, such as the type of error (e.g., "Duplicate Free", "Memory Smash" etc.), an identifier for the error (e.g., "E1" or "E2"), the memory protection operation to be performed, statistics on how often memory protection operations have already been performed for the unsafe allocation location, etc. Other types of memory errors that may be detected by memory management tool 120 in various embodiments may include, for example, premature frees, premature garbage collection operations, memory leaks, etc.; further details about these error types are provided below.

Memory management tool 120 may be configured to use error database 140 to check, when a given allocation operation is performed during the execution of application 102, whether the allocation is performed from a location previously designated as an unsafe allocation location. If an object is allocated from an unsafe allocation location, memory management tool 120 may designate the object as a memory protection candidate (MPC) 160 in some embodiments. When another operation (such as an invocation of a free( ) function or a garbage collection operation) is later performed on the MPC object, memory protection tool 120 may perform a memory protection operation to avoid or prevent potentially unsafe behavior. For example, in FIG. 1, memory protection tool 120 may be configured to designate object "K" as an MPC 160A, since "K" is allocated in operation 130G from allocation location "0x1bd32", which was earlier identified as an "unsafe" allocation location in error record 170A. Similarly, object "P" may be designated as an MPC 160B because it is allocated (in operation 130J) from allocation location "0x5c2d65", which was also earlier designated as an unsafe allocation location in error record 170B. When an operation is attempted on "K" (e.g., a free( ) operation 130K) or on "P", the memory management tool may intervene and perform one or more protection operations, e.g., by replacing a free( )

operation with the logical equivalent of a "no-operation" or no-op and designating the object as a candidate for eventual garbage collection. In one embodiment, in addition to recognizing that an object is a candidate for a future memory protection operation when the object is allocated from an unsafe allocation location, memory management tool 120 may perform a memory protection operation associated with the allocation itself (e.g., additional memory may be allocated for the object beyond the requested amount, or the object may be allocated from a special region in memory, etc.). In some embodiments, object names or address ranges of memory protection candidates 160 may be stored in an additional database or data structure. It is noted that the word "object" is used generically for entities (e.g., "A", "B", "K", "P" in FIG. 1) for which memory is dynamically allocated, and that the use of the word "object" is not meant to restrict the use of the techniques described above to applications written in object-oriented languages—for example, the techniques may be used for applications written in non-object-oriented languages such as C, Pascal, etc. as well as for applications written in object-oriented languages such as C++. It is also noted that in some embodiments, a plurality of memory protection operations may be performed corresponding to each object identified as being allocated from an unsafe allocation location: e.g., a first memory protection operation may be performed when the object is allocated, and another memory protection operation may be performed when it is freed.

In some embodiments, e.g., in order to detect memory allocations and memory management errors, memory management tool 120 may be configured to dynamically replace one or more memory management libraries or functions invoked by the application 102 with customized or instrumented versions, or to modify the binary code of the application with instrumentation instructions. For example, in some operating environments (such as various Linux or UNIX™-based operating systems), an application may have an associated environment variable such as "LD_PRE-LOAD" that supports the ability to modify the order in which various shared libraries are loaded or searched for a given function to be executed. By placing a substitute memory management library that includes modified/instrumented versions of various memory management functions at an appropriate location within the set of libraries identified by the environment variable, memory management tool 120 may arrange for application 102 to execute the modified or instrumented versions instead of the original, unmodified versions. The modified versions may include code to maintain metadata on dynamically created objects in the application; e.g., in one implementation, a separate instrumentation record or header may be created for the memory allocated in each malloc( ) call, and stored in an independent heap location (e.g., in a location that is not adjacent or near to the object that is allocated, and is therefore less likely to be overwritten or damaged by a memory management error associated with the allocated memory). The instrumentation record may be used to store various types of information on the allocated memory, such as checksums calculated from the allocated memory, etc., that may be used to detect errors such as premature frees and/or to perform various memory protection operations. Similar techniques of code substitution may be used in other operating environments, e.g., using other environment variables in other operating systems. In some embodiments, a memory management library supplied by an operating system may be modified, e.g., a few additional instructions may be added at the start of memory allocation functions like malloc( ) and free( ) supplied by the operating system to redirect memory management function calls to custom versions of the functions. Memory management tool 120 may instrument an application 102 using such techniques without, for example, having access to source code for the application, thus allowing the memory protection mechanisms described above to be applied in production environments where source code is often unavailable.

In one embodiments, the support for selective memory error correction/protection based on the designation of allocation locations as "unsafe" may be provided as an optional feature of an existing memory error handling mechanism. For example, in one embodiment, memory management tool 120 may be configured to operate in one of two modes: a first mode in which the tool performs memory protection operations globally, e.g., for all allocation locations in a given program, and a second mode in which the memory protection operations are performed selectively based on error record entries 170 identifying unsafe allocation locations as described above. Such a tool may be implemented for a variety of reasons, e.g., to maintain compatibility with existing system management scripts while optionally providing improved performance. In some implementations, memory management tool 120 may be configured to provide an estimate or measurement of resources used by the tool itself (e.g., how much memory and/or CPU is used for error database 150 and allocation location database 140), allowing users to easily quantify the benefits of selective memory error correction.

Memory management tool 120 may be used to detect and prevent memory management errors in production environments in some embodiments. For example, the initial detection of an error and the protective operations performed for other objects allocated at the unsafe allocation location corresponding to the error may all occur during the same execution of a production application in such embodiments. In other embodiments, memory management tool 120 may also be used in a test environment prior to deployment of an application to a production environment. For example, the techniques described above of storing allocation location information for all allocations, and designating a subset of the allocation locations as being potentially unsafe based on detected errors, may be applied during a test run or runs, where for example an application is subjected to various expected workload levels. Having identified the unsafe allocation locations in the test runs, the application may then be instrumented to eliminate or avoid each of the errors detected, before being deployed to the production environment. Thus, one or more errors may be initially detected during a first execution of the application 102 in a test environment, and protective actions corresponding to the designated unsafe allocation locations may be performed during subsequent executions. In this way, proactive memory protection operations may be performed in the production environment prior to an occurrence of any actual error in the production environment. E.g., if the application 102 of FIG. 1 were instrumented and modified in a test environment, "0x1abd32" would have been designated as an unsafe allocation location even before operation 130A is executed at the production environment, and protective memory operations may be performed for object "A" to preclude the occurrence of any error such as the duplicate free of operation 130F.

In some embodiments, a list or "profile" of unsafe allocation locations (e.g., part or all of error database 150) may be maintained in a persistent form for an application based on one or more executions. If the application is moved or redeployed from its original operating environment to a different operating environment, or another instance of the application is set up in an new operating environment, the list of unsafe allocation locations may be provided for use in the different or new operating environment. For example, a banking application may first be deployed at one bank data center, and after the initial deployment is successful, the application may be replicated (i.e., additional instances may be deployed) at other data centers of the same banking company. A compact disk or other media including the list of unsafe allocation operations identified in the first deployment (or in a test environment prior to the first deployment) may be provided for the new deployments. The list may be used to perform memory protection operations in the new operating environment without requiring re-instrumentation or re-detection of errors in the new environment, thus potentially saving substantial time and computing resources. Since the unsafe allocation location list was obtained in a particular operating environment, for example using a particular version of shared libraries, device drivers, etc., the unsafe allocation location list may potentially be invalid or stale in a new operating environment where different versions of shared libraries, drivers etc. are used. For example, if a particular function F1 was a source of many memory management errors in version 5.0 of a shared library in which errors and unsafe allocation locations were detected, the function F1 may have been modified in version 6.0, so that the program counter values or stack information identified in the allocation locations may have changed. In some implementations, in order to avoid inadvertent use of stale unsafe allocation location lists, a unique identification of the set of components (shared library versions, application code versions, etc.) may be maintained along with the unsafe allocation location list. The identification may be implemented using a variety of different techniques, such as checksums for each of the various components and/or a text file containing version numbers, executable file sizes, creation dates, timestamps, etc.

Part or all of the allocation location information (e.g., the hexadecimal program counter values such as "0x5c2d65" shown in FIG. 1) may be stored as absolute numerical quantities in some embodiments. In other embodiments, program counter values included within the allocation location information may be stored as offsets with respect to a starting address of a program or shared library. If the order in which libraries or programs are loaded changes from one execution environment to another, or if the memory address at which a library or program is loaded changes from one execution environment to another, the use of relative program counter values in such embodiments may ensure that the memory protection operations are still performed for the appropriate memory operations. It is noted that in embodiments where program counter values are stored as offsets, a recompilation or an upgrade to a new version of a shared library or another portion of the application may potentially result in the offsets becoming invalid. In some embodiments, memory management tool 120 may be configured to store in persistent storage a list of shared libraries used in the application, along with corresponding checksums or digest values (e.g., calculated using the MD5 Message Digest algorithm) and the unsafe allocation location information. Whenever the application 102 is started, the checksums/digests may be recalculated for the shared libraries, and if any of the checksum values differ from those stored earlier, unsafe allocation locations corresponding to the libraries whose checksums have changed may be discarded as being invalid (and in some implementations, administrators may be informed). The unsafe allocation locations for the changed libraries may then be recomputed during execution using the techniques described above.

Figure 2:
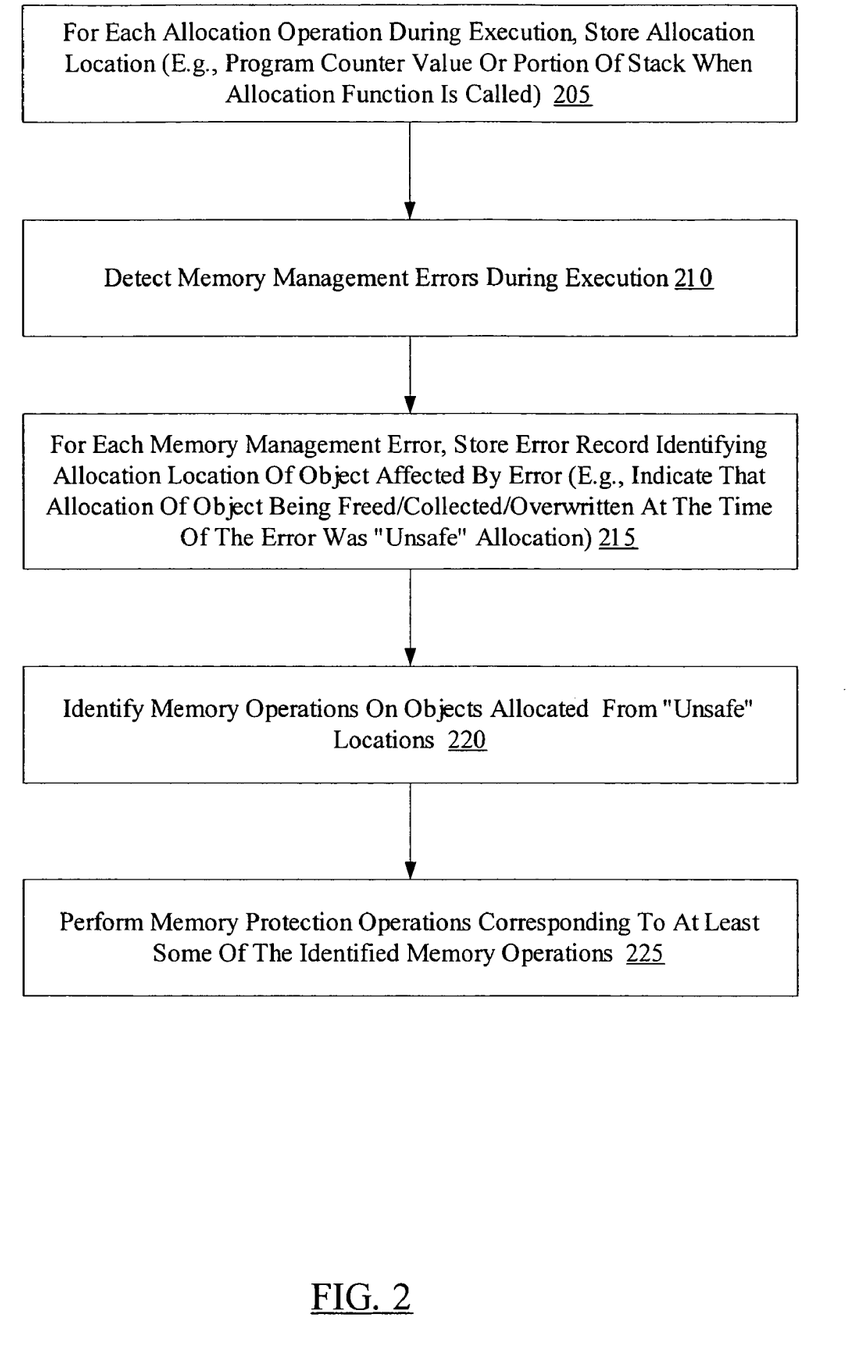
FIG. 2 is a flow diagram illustrating aspects of the operation of a memory management tool, according to one embodiment.

FIG. 2 is a flow diagram illustrating aspects of the operation of memory management tool 120, according to one embodiment. The memory management tool 120 may be configured to record allocation location information in allocation location database 140 for each allocation operation encountered during the execution of an application 102 (block 205 of FIG. 2). The specific content of the allocation location information may vary in different embodiments: e.g., in one embodiment, a single numerical quantity such as a hexadecimal program counter of a function that invokes a malloc( ) function may be saved in an allocation location record, while in other embodiments more detailed information such as multiple levels of stack information (function names and associated absolute or relative program counter values) may be saved.

As shown in block 210 of FIG. 2, memory management tool 120 may be configured to detect memory management errors dynamically during the execution of the application 102 (block 210). A number of different types of memory management errors may be detected in different embodiments using a variety of error detection techniques, as described below. In one implementation, memory management tool 120 may redirect calls made from the application 102 to memory management functions such as malloc( ) and free( ) to customized or instrumentation versions of the memory management functions (such as "CustoMalloc( )" and "CustomFree( )"). A customized version of an allocation function such as malloc( ) may generate a data structure called a "header" for each allocation, and store information in the header that may be needed for detection and/or correction of various types of errors. The header may be stored in a portion of memory that is relatively distant from the allocated object itself, e.g., to prevent any memory management errors associated with the object from corrupting the header.

Using the header, a premature free operation, i.e., a freeing or de-allocation of an object that is still in use, may be detected using the following technique in one embodiment where malloc( ) and free( ) are used to allocate and deallocate objects respectively. A checksum of the object being freed may be computed in the call to free( ) (e.g., in the custom version of free( )), and the checksum may be stored in the header for the object. When malloc( ) is subsequently called and the memory freed earlier is chosen for allocation, the checksum is computed again and compared with the checksum stored in the header. If the two checksums differ, the object was modified after it was freed, indicating that the call to free( ) was premature. Duplicated frees of an object may be detected by storing a status of the object within the header for the object. The status may indicate, for example, whether the object is currently allocated (in-use) or free. If, when free( ) is called for an object, the object already has a free status, a duplicated free may be detected by memory management tool 120. In environments where conservative garbage collection is used for one or more objects, a premature garbage collection error may be detected if an object is collected while the program is still using the object. Conservative garbage collection is a technique that relies on identifying potential pointers within an application's address space (e.g., potential pointers within "root" objects as well as heap objects) based on the value of data (e.g., if a data value "looks like" a heap address or falls within a numerical range that is within heap address boundaries, the data value is assumed to be a pointer) to identify memory regions to be collected. Conservative garbage collection may be employed as an error correction/prevention mechanism, e.g., to respond to memory leaks in programs that use explicit rather than automatic memory management, in some embodiments. A premature garbage collection may occur, for example, if pointers are hidden from the garbage collector by scrambling or writing the pointers to disk, making the garbage collector erroneously conclude that an object is no longer in use. Memory management tool 120 may use the header for an object to store garbage collection status for the object: e.g., to indicate whether the object has already been collected. When free( ) is invoked for the object, a premature collection may be detected if the status of the object indicates that it has already been collected. A memory smash error may be detected using the following technique in one embodiment: at allocation, a "guard word" may be added to the end of the object with a value (which may be called a "magic number") that is unlikely to occur in the object. If, during a free( ) for the object, or in a heap check, the value is found to have been changed, a memory smash associated with the object is detected. Another type of memory management error, a memory leak (i.e., when an allocated object is never explicitly freed in the application) may be detected if unreachable objects are found in the heap. Other types of memory management errors may also be detected in some embodiments, such as late writes (writes to an object after the object has already been freed) and/or wild frees (attempts to free memory that was not dynamically allocated).

As shown in block 215 of FIG. 2, for each instance of a memory management error detected, memory management tool 120 may be configured to store an error record 170, e.g., in error database 150, indicating an allocation location of an object associated with or affected by the error. E.g., if object "A" allocated from allocation location "0x1abd32" is freed multiple times, or is involved in a memory smash, its allocation location may be identified as a potentially unsafe allocation location in an error record 170. The memory management tool 120 may, for example, look up an object (e.g., "A", "B", etc.) in allocation location database 140 corresponding to a memory address specified in the memory operation that results in an error, and store the allocation location of that object in the error record 170. That is, to generate an error record 170 for a memory management error, in some embodiments memory management tool 120 may search for an allocation location corresponding to an object involved in the error, or identified as an operand of the memory operation that resulted in the error. Various types of additional information may also be stored in the error record 170 in different embodiments, such as an error identifier, the type of the error, memory protection actions to be taken on objects allocated from the unsafe allocation location, etc.

Figure 3:
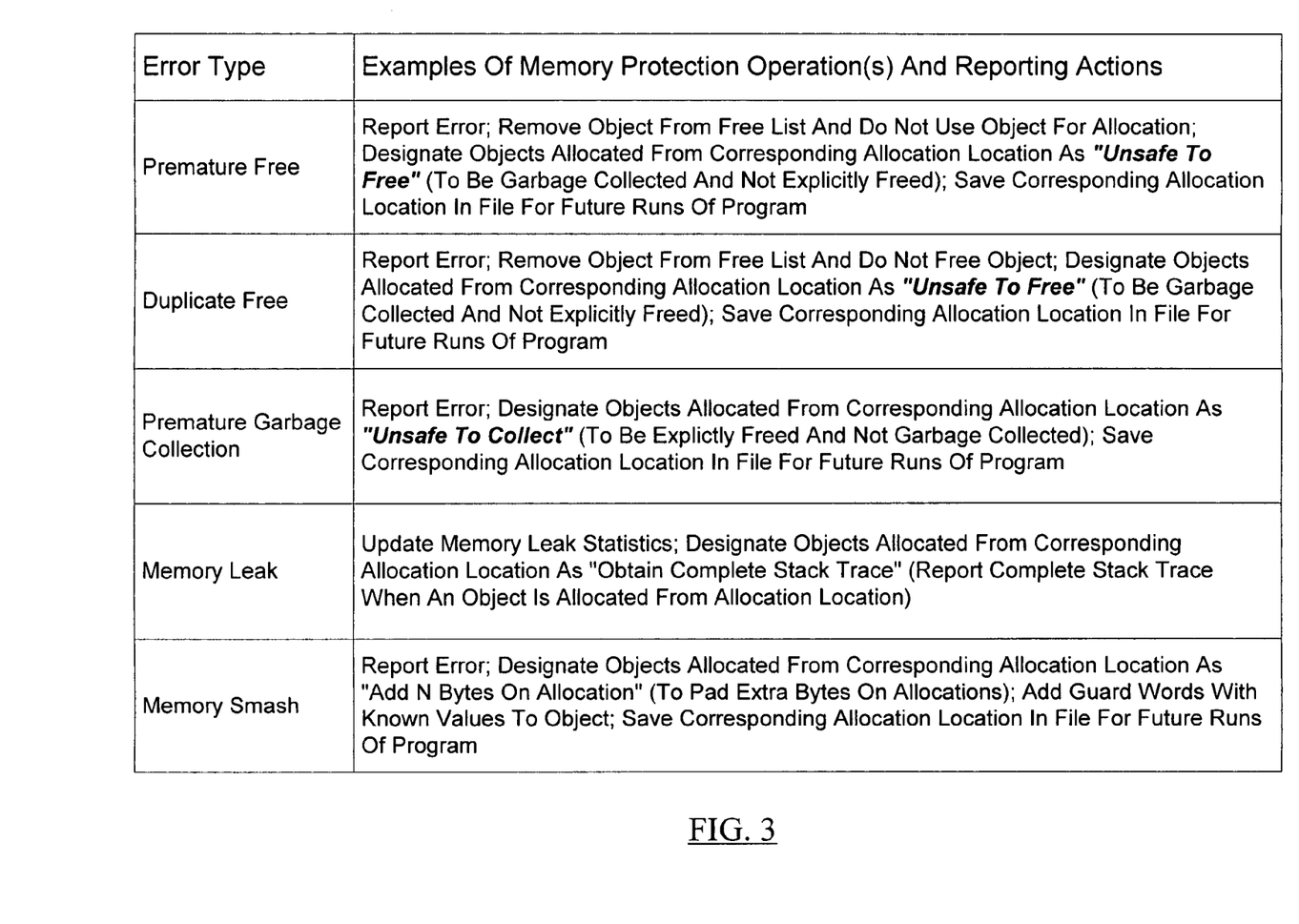
FIG. 3 is a table listing exemplary memory protection operations and reporting actions that may be performed by a memory management tool, according to one embodiment.

In one embodiment, whenever an object is allocated (e.g., using malloc( )) during the application execution, memory management tool 120 may be configured to check whether the corresponding allocation location has previously been identified as an unsafe allocation location in error database 150. If the corresponding allocation location has been designated as an unsafe allocation location, the newly allocated object may be marked (e.g., using a header object of the type described above) as a memory protection candidate object 160. Memory management tool 120 may be configured to identify one or more memory operations performed on the memory protection candidate object (including, for example, the malloc( ) call itself, as well as free( ), realloc( ) and other memory management functions), as shown in block 220 of FIG. 2, and to perform a memory protection operation for at least some of the memory operations identified (block 225). A variety of different types of memory protection operations that may be performed in different embodiments are shown in FIG. 3 and described below in further detail. It is noted that while malloc( ), free( ), realloc( ) etc. are used as examples of memory management functions herein, the techniques of using memory allocation location information to selectively perform memory protection operations may be used in embodiments where the memory management functions have other names, syntax and/or formats.

FIG. 3 is a table listing several exemplary memory protection operations and reporting actions that may be performed by the memory management tool 120 in response to detecting various types of memory management errors, according to one embodiment. For example, in response to a detection of a premature free operation, memory management tool 120 may be configured to report the error to an administrator or user (e.g., using an error reporting infrastructure described in further detail below in conjunction with the description of FIG. 4) and/or to remove the freed memory from the free list and mark it as not to be used for allocation in one embodiment. In addition, the allocation location may be designated as "unsafe to free" (e.g., by storing a particular value in error database 150 and/or allocation location table 140), indicating that any additional objects allocated from that location should be garbage collected instead of being explicitly freed. A conservative garbage collector may be employed for collection of "unsafe to free" objects in some embodiments. After the allocation location has been designated as "unsafe to free", subsequent calls to free( ), either during the same execution or in a different execution of the application, may not be honored (e.g., the calls to free( ) may result in no memory actually being freed). Further, in some embodiments, the "unsafe to free" allocation location may be saved in a file or some other persistent storage object for use for proactive memory protection operations in subsequent executions of the application. Several of the other different types of errors shown in FIG. 3 may also be reported on (e.g., duplicate frees, premature collections, memory smashes), and the corresponding unsafe allocation locations may also be saved in persistent storage (along with an indication of the type of error detected) in some embodiments.

As shown in FIG. 3, in response to a duplicate free operation, memory management tool 120 may also mark the allocation location as "unsafe to free". Since the object was already free, the duplicate free operation may not be honored. In response to a premature garbage collection operation in embodiments where conservative garbage collection is employed, the allocation location may be marked "unsafe to collect", indicating that no further garbage collection is to be performed on the object, and that the object is to be explicitly freed instead (i.e., subsequent calls to free the object are to be honored). For memory leak operations, memory management tool 120 may be configured to designate the allocation location as "obtain complete stack trace", indicating that the complete stack trace for subsequent allocations from that location should be stored and reported if another memory leak corresponding to an object allocated from that location is detected. Memory leak statistics (e.g., number of leaked objects, total memory leaked, etc.) may also be updated when a memory leak is detected.

For a detected memory smash operation, a memory protection operation may include designating the allocation location as "add N bytes on allocation", indicating that N additional bytes of extra "padding" are to be added to the memory allocated for any object allocated from the location. The number of bytes N to be added may be selected using a variety of techniques in different embodiments. For example, in one embodiment, the initial value of N may be selected as a specified fraction of the size of the allocated object (e.g., 20% or 50% of the object size), and in another embodiment, a fixed number of bytes may be added (e.g., N may be a configuration parameter specified by a user). In some embodiments, an adaptive algorithm may be used to compute N: e.g., if memory management tool 120 first adds 8 bytes to an object, and then detects that 8 bytes were not sufficient (e.g., if the last of the eight added bytes were overwritten by a memory smash), the memory management tool 120 may double the padding to 16 bytes for other allocations from the same location, and so on. In some embodiments, guard words with a known value may be added in the padding region of extra bytes. For example, a first guard word may be added immediately after the object, and a second guard word may be added at the end of he padding region. If the values of the second guard word is detected to have been modified when the object is freed, indicating that the second guard word was overwritten or "smashed", memory management tool 120 may be configured to increase (e.g., double) the number of padding bytes for subsequent allocations. In addition to the types of errors and protection operations enumerated in FIG. 3, in some embodiments memory management tool 120 may also detect other types of errors and take other types of measures in response to the detection of the errors. In one embodiment, for example, different types of memory management errors may have different "severity levels" associated with them, and in response to a detection of a high-severity or catastrophic error, memory management tool 120 may be configured to initiate a restart of the application 102 (e.g., either by sending a restart request to an administrator, or by automatically restarting the application).

Figure 4:
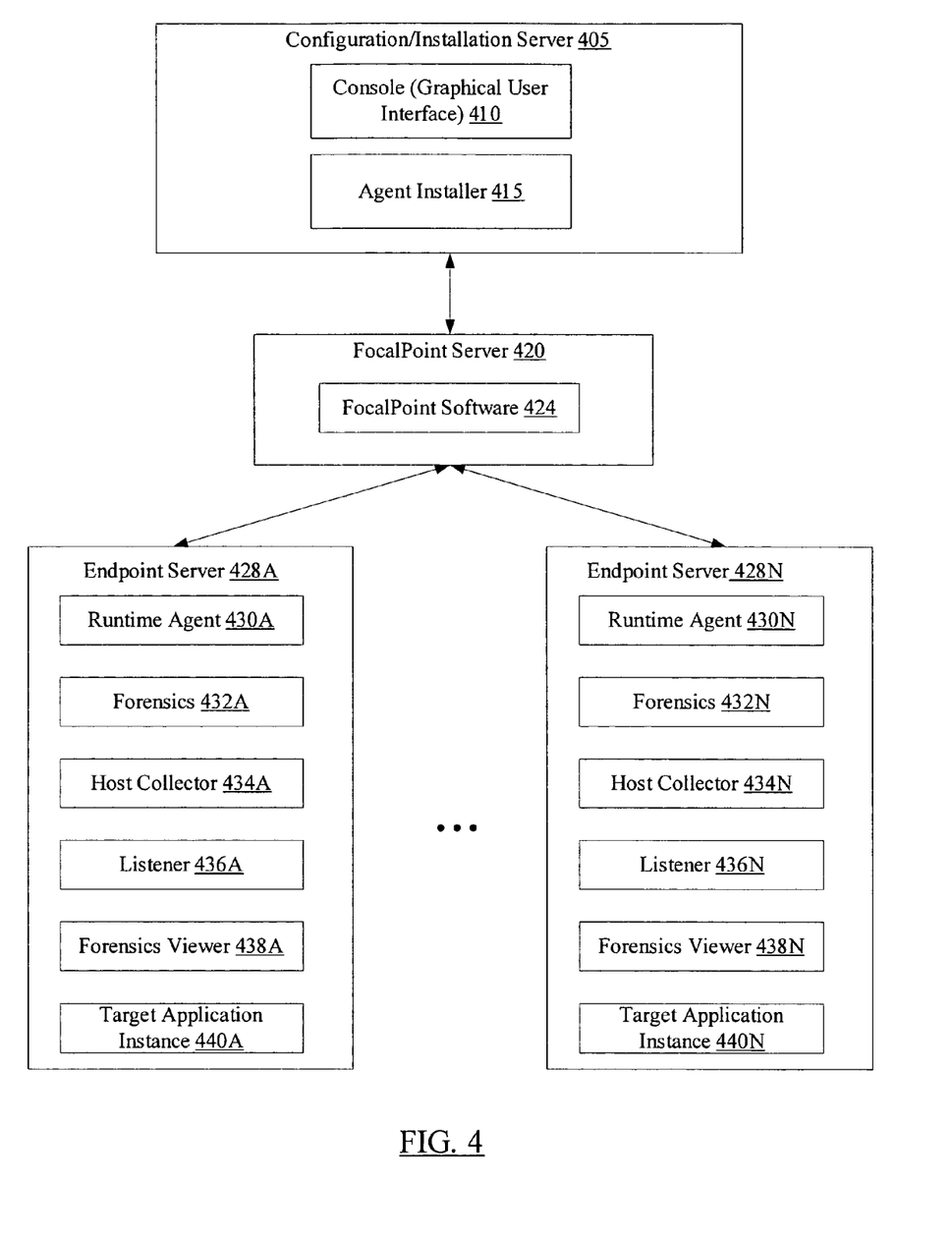
FIG. 4 is a block diagram illustrating various subcomponents of a distributed version of memory management tool, according to one embodiment.

In some embodiments, memory management tool 120 may comprise a plurality of subcomponents in a distributed or clustered configuration. FIG. 4 is a block diagram illustrating various subcomponents of a distributed version of memory management tool 120, according to one embodiment. In one embodiment, the subcomponents of memory manager 120 shown in FIG. 4 may form part of a more general application reliability management product such as a version of VERITAS™ Application Saver. As shown in FIG. 4, target application instances 440A-440N (collectively, target application instances 440) for which memory protection operations are to be performed may be distributed across a plurality of endpoint servers 428A-428N (collectively, endpoint servers 428). One or more of the target application instances 440 may be instances of a distributed application (such as a distributed database management system, or a clustered web services application) in some embodiments, while in other embodiments each of the target application instances may be independent applications. Multiple target application instances 440 may be executed on the same endpoint server 428 in some embodiments. Memory protection tool 120 may comprise a plurality of subcomponents that are also distributed across the endpoint servers 428 in some embodiments, such as respective runtime agents 430, forensics 432, host collectors 434, listeners 436, and forensics viewers 438. In addition, memory management tool 120 may also comprise focal point software 424 at a focal point server 420, a configuration console 410 and an agent installer 415 on a configuration/installation server 405. The console 410 may be used as an operational interface to configure and control other subcomponents of memory management tool 120, to view reports (e.g., error reports for various kinds of memory management errors detected and/or protective memory operations performed), to monitor application health, etc. The agent installer 415 may be configured to install other subcomponents as needed or requested, and in some embodiments may also be configured to monitor the installed components. Focal point software 424 may server as an aggregator of data gathered by memory management tool 120 at the endpoint servers 428, and may provide the collected metrics to console 410. A listener 436 may comprise a process or thread at each endpoint server 428, configured to handle install and upgrade requests and transfer data for a corresponding host collector 434. A host collector 434 may collect metrics and alerts for each of the target application instances 440 on a particular node from runtime agents 430 and send them to focal point software 424. Runtime agents 430 may be configured to detect memory allocations and errors and perform protective memory operations as needed for the target applications 440 using the techniques described above. Forensics 432 may capture relevant system information, such as an exact sequence of statement execution across multiple threads when an application fails or at other times specified via the console; the results may be viewed locally at the endpoint server using a forensics viewer 432. One or more of the subcomponents shown in FIG. 4 may be optional in some embodiments; e.g., forensics 432 and forensics viewer 438 may not be installed at one or more endpoint servers 428. The endpoint servers 428, the focal point server 420 and the configuration/installation server 405 may be linked to one another over a network.

As noted above, in response to the detection of various types of memory management errors, in some embodiments memory management tool 120 may report the occurrence of the errors and/or protective memory operations performed in response to the detection of errors. The reports may be generated and/or displayed in various formats in different embodiments. For example, in one embodiment, aggregated statistics on the errors detected and/or memory protection operations performed may be displayed via a graphical user interface (GUI) such as console 410 to an administrator. The GUI may indicate, for example, the number of memory management errors of different types that have been detected so far during an execution of an application, and the displayed numbers may be updated in real time as more errors are detected. The GUI may also provide mechanisms allowing an administrator to obtain additional details about the various errors and the memory protection operations in some embodiments (e.g., whether the errors are concentrated in a particular section of application or shared library code, etc.).

In one embodiment, the memory management tool 120 may provide one or more interfaces allowing users or administrators to selectively enable and/or disable the use of memory protection operations for specified types of memory management errors, or for specified target applications, libraries etc. For example, in one embodiment, an administrator may use a console 410 or a command-line interface to instruct memory management tool 120 not to perform garbage collection for a particular shared library. Similar interfaces may also be used in some embodiments to dynamically switch between selective memory protection mode (e.g., when memory protection operations are performed only for objects allocated from unsafe locations) and global memory protection mode. Input parameters for memory management tool 120, such as "N", the number of bytes to be added as padding for allocations in response to memory smash detections, or a parameter selecting a technique to compute N, may also be specified by administrators via console 410 or a command line interface. In some embodiments, e.g., in addition to displaying reports of errors and protection operations, memory management tool 120 may also provide a detailed log of its operations (e.g., listing various errors found and corrected, etc.). In some embodiments, memory management tool 120 may perform error detection and protection operations without any user interaction, e.g., in a completely automated fashion. In other embodiments, an administrator may be notified, either periodically or continuously, of the errors detected and protection operations performed, and the administrator may respond to the notifications by providing additional instructions to the memory management tool 120.

Memory management tool 120 may be configured to provide aggregate reports of error detections and memory protection operations (e.g., in the form of daily, weekly, or monthly reports) in one embodiment, e.g., so that long-term trends may be analyzed and the stability of application behavior over time may be determined. A configuration/reporting interface similar to console 410 may also be provided by memory management tool in non-distributed embodiments, e.g., in embodiments where some or all of the other components shown in FIG. 4 may not be implemented.

Figure 5:
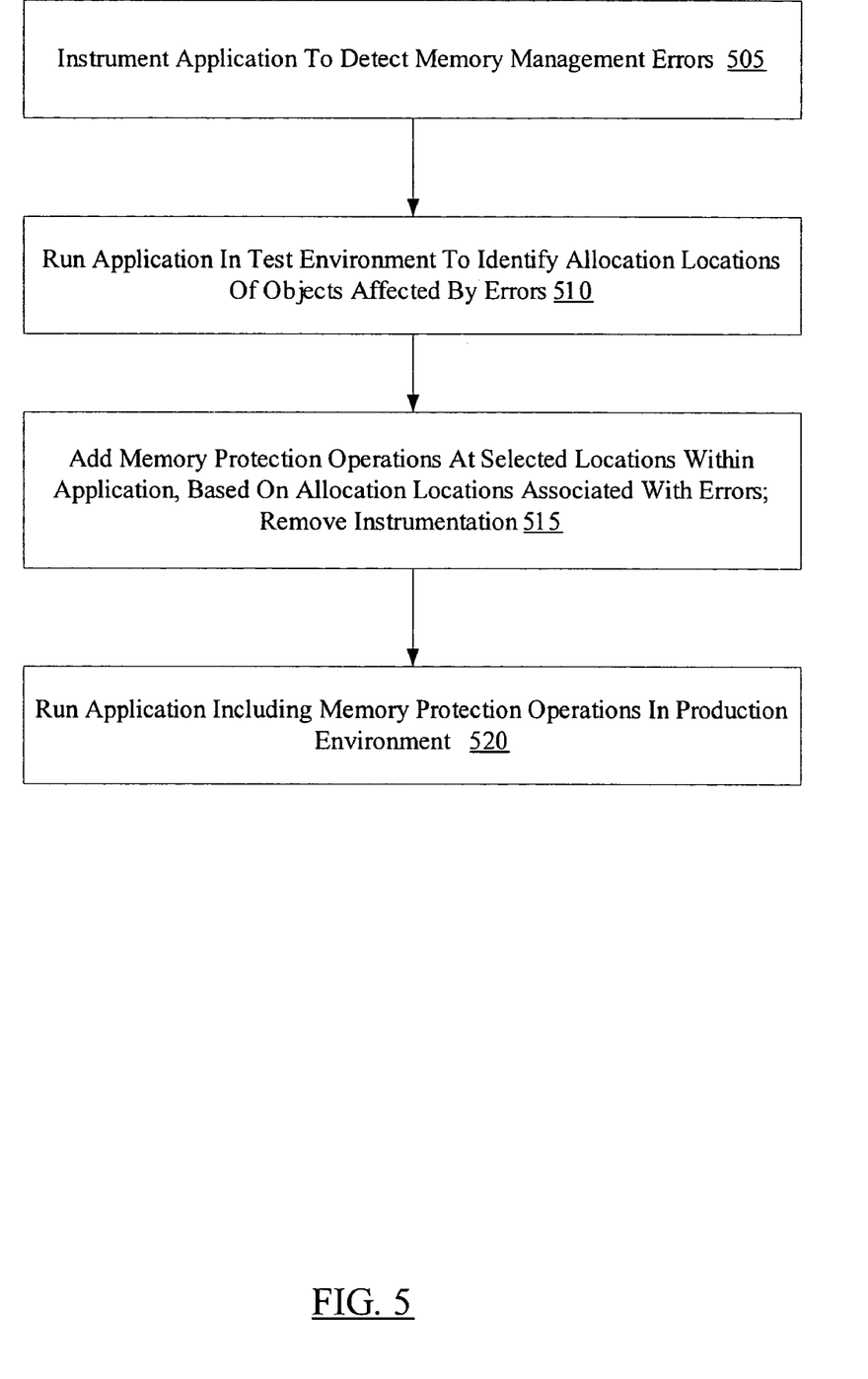
FIG. 5 is a flow diagram illustrating aspects of the operation of a memory management tool in an embodiment where an instrumented version of an application is executed in a test environment to detect unsafe allocation locations prior to deployment of the application in a production environment.

FIG. 5 is a flow diagram illustrating aspects of the operation of memory management tool 120 in an embodiment where an instrumented version of an application is executed in a test environment to detect unsafe allocation locations prior to deployment of the application in a production environment. As shown in block 505 of FIG. 5, memory management tool 120 may be configured to instrument the application (e.g., by adding instrumentation code to memory management operations) to detect memory management errors. The application may then be executed in a test environment (block 510), e.g., by exercising the application with various workloads considered representative of production workloads, and during the execution, unsafe allocation locations corresponding to memory management errors may be detected, e.g., using allocation location database 140 and error database 150. After the execution in the test environment, memory protection operations may be added at selected locations within the application (e.g., additional bytes may be allocated to prevent memory smashes) identified using the instrumentation (block 515), and in some embodiments the instrumentation code may be removed. The modified application code may then be executed in production environments (block 520). In this way, memory operations of production operations may be protected with very little overhead, since only the portions of the application that were found to be associated with errors may be modified, and no instrumentation code may be executed in the production version of the application.

Figure 6:
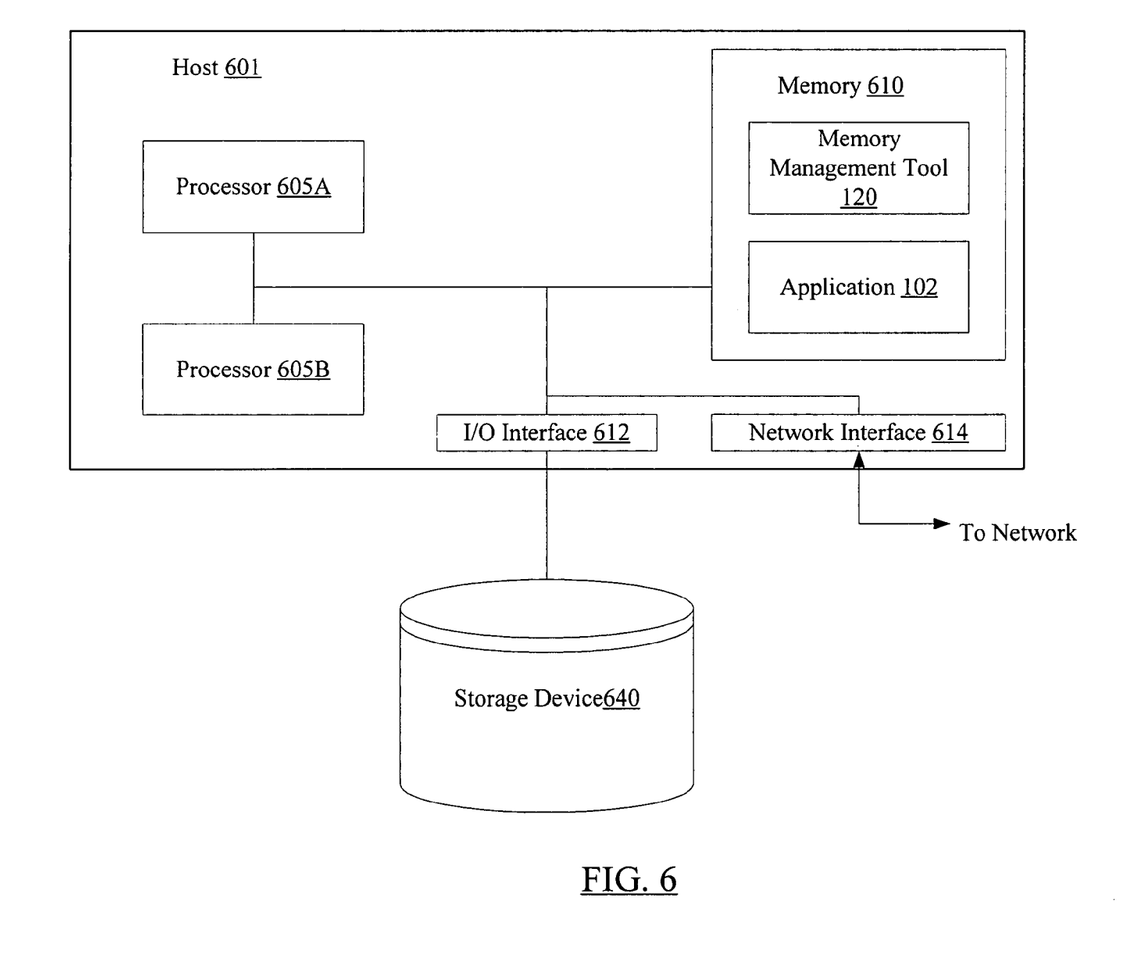
FIG. 6 is a block diagram illustrating constituent elements of a computer host, according to one embodiment.

FIG. 6 is a block diagram of a computer host 601 at which memory management tool 120 may be executed, according to one embodiment. As shown, host 601 may include one or more processors 605, such as processors 605A and 605B. In various embodiments, processors 605 may be implemented using any desired architecture or chip set, such as the SPARC™ architecture from Sun Microsystems or the x86-compatible architectures from Intel Corporation, Advanced Micro Devices, etc. Program instructions that may be executable by the processors 605 to implement part or all of the functionality of memory management tool 120 and/or application 102 may be partly or fully resident within a memory 610 at a given point in time, and may also be stored on a storage device 640. Memory 610 may be implemented using any appropriate medium such as any of various types of RAM (e.g., DRAM, SDRAM, RDRAM, SRAM, etc.). In addition to processors 605 and memory 610, host 601 may also include one or more I/O interfaces 612 providing access to storage devices 640, one or more network interfaces 614 providing access to a network, interfaces to display devices (not shown), and the like. In some embodiments where components of memory management tool 120 are distributed over multiple servers as shown in FIG. 4, host 601 may be utilized as an endpoint server 428, a configuration/installation server 405 and/or a focal point server 420. Any of a variety of storage devices 640 may be used to store the instructions as well as data for memory management tool 120 in different embodiments, include any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 640 may be directly coupled to host 601 in some embodiments (e.g., using the Small Computer Systems Interface (SCSI) protocol), or may be accessible over any desired storage interconnect such as a fiber channel fabric or storage area network (SAN) in other embodiments.

In addition to memory management tool 120 and application 102, memory 610 and/or storage devices 640 may also store operating systems software, application server software and/or software for other applications in various embodiments. In some embodiments, memory management tool 120 may be included within a more general application reliability management tool, an application server, a storage management software product or another software package, while in other embodiments, memory management tool 120 may be packaged as a standalone product. In one embodiment, one or more subcomponents of memory management tool 120 illustrated in FIG. 4, may be implemented as independent software packages or tools. In some embodiments, part or all of the functionality of memory management tool 120 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above-disclosure is fully appreciated. It is intended that the following claims be interpreted to embrace all such variations and modifications.

What is claimed is:

1. A system, comprising:
   a processor; and
   memory coupled to the processor;
   wherein the memory stores program instructions executable by the processor to:
   store an error record in a database corresponding to a memory management error detected during an execution of an application, wherein the memory management error is associated with an object allocated during the execution, wherein the error record identifies an allocation location within the application at which the object was allocated;
   identify, using the error record, at least one memory operation in the application performed on an other object allocated from the allocation location identified in the error record; and
   perform at least one memory protection operation corresponding to the at least one memory operation identified using the error record.

2. The system as recited in claim 1, wherein the instructions are further executable to:
   examine the database to determine whether a memory protection operation is to be performed for a given memory operation during an execution of the program;
   in response to determining that a memory protection operation is to be performed for the given memory operation, perform the memory protection operation; and
   in response to determining that a memory protection operation is not to be performed for the given memory operation, perform the given memory operation without performing a corresponding memory protection operation.

3. The system as recited in claim 1, wherein the error record indicates a type of memory protection operation to be performed for memory operations on objects allocated from the identified allocation location.

4. The system as recited in claim 1, wherein the instructions are further executable to:
  store a respective identification of an allocation location corresponding to each object allocated during the execution; and
  prior to storing the error record, generate the error record using a stored identification of an allocation location corresponding to the object.

5. The system as recited in claim 1, wherein the allocation location is specified in the error record as one or more program counter values.

6. The system as recited in claim 1, wherein the allocation location is specified in the error record as a portion of an execution stack.

7. The system as recited in claim 1, wherein the memory management error comprises at least one of: a memory smash operation, a premature free operation, a duplicate free operation, a premature garbage collection operation, and a memory leak.

8. The system as recited in claim 7, wherein:
  if the memory management error comprises a memory smash operation, a corresponding memory protection operation comprises allocating a number of extra bytes for the other object;
  if the memory management error comprises a premature free operation or a duplicate free operation, a corresponding memory protection operation comprises designating the other object as an object to be collected via garbage collection instead of being explicitly freed;
  if the memory management error comprises a premature garbage collection operation, a corresponding memory protection operation comprises designating the other object as an object to be explicitly freed instead of being collected via garbage collection; and
  if the memory management error comprises a memory leak, a corresponding memory protection operation comprises generating a report of a stack trace of the application when the other object is allocated.

9. The system as recited in claim 1, wherein the instructions are further executable to:
  provide an interface configured to display a representation of one or more memory management errors detected during the execution, wherein the representation comprises an identification of the type of each memory management error of the one or more memory errors.

10. The system as recited in claim 9, wherein the interface comprises a mechanism enabling a user to selectively enable and disable a use of memory protection operations corresponding to one or more types of memory management errors.

11. The system as recited in claim 1, wherein the at least one memory protection operation is performed during the same execution of the application in which the memory management error is detected.

12. The system as recited in claim 1, wherein the at least one memory protection operation is performed during a different execution of the application than the execution in which the memory management error is detected, wherein the instructions are further executable to:
  generate a persistent data structure comprising the error record;
  wherein the at least one memory operation is identified during the different execution using the persistent data structure.

13. The system as recited in claim 1, wherein the execution of the application comprises an invocation of one or more functions of a shared library, wherein the allocation location is within a function of the shared library.

14. A computer-implemented method, comprising:
  storing an error record in a database corresponding to a memory management error detected during an execution of an application, wherein the memory management error is associated with an object allocated during the execution, wherein the error record identifies an allocation location within the application at which the object was allocated;
  identifying, using the error record, at least one memory operation in the application performed on an other object allocated from the allocation location identified in the error record; and
  performing at least one memory protection operation corresponding to the at least one memory operation identified using the error record.

15. The method as recited in claim 14, further comprising:
  examining the database to determine whether a memory protection operation is to be performed for a given memory operation during an execution of the program;
  in response to determining that a memory protection operation is to be performed for the given memory operation, performing the memory protection operation; and
  in response to determining that a memory protection operation is not to be performed for the given memory operation, performing the given memory operation without performing a corresponding memory protection operation.

16. The method as recited in claim 14, further comprising:
  storing a respective identification of an allocation location corresponding to each object allocated during the execution; and
  prior to storing the error record, generating the error record using a stored identification of an allocation location corresponding to the object.

17. The method as recited in claim 14, wherein the allocation location is specified in the error record as one or more program counter values.

18. The method as recited in claim 14, wherein the memory management error comprises at least one of: a memory smash operation, a premature free operation, a duplicate free operation, a premature garbage collection operation, and a memory leak.

19. The method as recited in claim 18, wherein,
  if the memory management error comprises a memory smash operation, a corresponding memory protection operation comprises allocating a number of extra bytes for the other object;
  if the memory management error comprises a premature free operation or a duplicate free operation, a corresponding memory protection operation comprises designating the other object as an object to be collected via garbage collection instead of being explicitly freed;
  if the memory management error comprises a premature garbage collection operation, a corresponding memory protection operation comprises designating the other object as an object to be explicitly freed instead of being collected via garbage collection; and
  if the memory management error comprises a memory leak, a corresponding memory protection operation comprises generating a report of a stack trace of the application when the other object is allocated.

20. A tangible computer readable medium comprising program instructions, wherein the instructions are computer-executable to:
  store an error record in a database corresponding to a memory management error detected during an execution of an application, wherein the memory management error is associated with an object allocated during the execution, wherein the error record identifies an allocation location within the application at which the object was allocated;

identify, using the error record, at least one memory operation in the application performed on an other object allocated from the allocation location identified in the error record; and perform at least one memory protection operation corresponding to the at least one memory operation identified using the error record.

21. The computer readable medium as recited in claim 20, wherein the instructions are further computer executable to:

examine the database to determine whether a memory protection operation is to be performed for a given memory operation during an execution of the program;

in response to determining that a memory protection operation is to be performed for the given memory operation, perform the memory protection operation; and in response to determining that a memory protection operation is not to be performed for the given memory operation, perform the given memory operation without performing a corresponding memory protection operation.

22. The computer readable medium as recited in claim 20, wherein the instructions are further computer executable to:

store a respective identification of an allocation location corresponding to each object allocated during the execution; and prior to storing the error record, generate the error record using a stored identification of an allocation location corresponding to the object.

23. The computer readable medium as recited in claim 20, wherein the allocation location is specified in the error record as a portion of a stack trace.

24. The computer readable medium as recited in claim 20, wherein the memory management error comprises at least one of: a memory smash operation, a premature free operation, a duplicate free operation, a premature garbage collection operation, and a memory leak.

25. The computer readable medium as recited in claim 24, wherein, if the memory management error comprises a memory smash operation, a corresponding memory protection operation comprises allocating a number of extra bytes for the other object;

if the memory management error comprises a premature free operation or a duplicate free operation, a corresponding memory protection operation comprises designating the other object as an object to be collected via garbage collection instead of being explicitly freed;

if the memory management error comprises a premature garbage collection operation, a corresponding memory protection operation comprises designating the other object as an object to be explicitly freed instead of being collected via garbage collection; and if the memory management error comprises a memory leak, a corresponding memory protection operation comprises generating a report of a stack trace of the application when the other object is allocated.

* * * * *